(12) United States Patent
Mandrika et al.

(10) Patent No.: US 10,365,919 B1
(45) Date of Patent: Jul. 30, 2019

(54) MANAGING SOFTWARE ASSETS INSTALLED IN AN INTEGRATED DEVELOPMENT ENVIRONMENT

(71) Applicant: Google LLC, Mountain View, CA (US)

(72) Inventors: Konstantin V. Mandrika, Dover, NH (US); Matthew Ryan Willis, Quincy, MA (US); Hemal Shah, Cambridge, MA (US); Tali Jill Sason, Sommerville, MA (US); Artur Borges Adib, South Burlington, VT (US)

(73) Assignee: Google LLC, Mountain View, CA (US)

(*) Notice: Subject to any disclaimer, the term of this patent is extended or adjusted under 35 U.S.C. 154(b) by 129 days.

(21) Appl. No.: 15/597,258

(22) Filed: May 17, 2017

Related U.S. Application Data

(63) Continuation of application No. 15/065,116, filed on Mar. 9, 2016, now Pat. No. 9,817,655.

(51) Int. Cl.
 *G06F 8/65* (2018.01)
(52) U.S. Cl.
 CPC .................................... *G06F 8/65* (2013.01)
(58) Field of Classification Search
 None
 See application file for complete search history.

(56) References Cited

U.S. PATENT DOCUMENTS

| | | | |
|---|---|---|---|
| 6,574,729 B1* | 6/2003 | Fink | G06F 21/105 707/999.001 |
| 7,890,919 B1* | 2/2011 | Williams | G06F 8/71 717/100 |
| 9,454,363 B1* | 9/2016 | Angell | G06F 8/65 |
| 9,632,765 B1* | 4/2017 | Falcone | G06F 16/1744 |
| 2002/0169591 A1 | 11/2002 | Ryzl | |
| 2003/0236657 A1 | 12/2003 | Ryzl | |
| 2004/0158811 A1* | 8/2004 | Guthrie | G06F 8/20 717/103 |
| 2009/0077165 A1 | 3/2009 | Rhodes et al. | |
| 2009/0083268 A1* | 3/2009 | Coqueret | G06F 8/71 |
| 2013/0031551 A1* | 1/2013 | Agarwal | G06F 9/06 718/1 |
| 2015/0254073 A1* | 9/2015 | Menard | G06F 8/71 717/122 |

* cited by examiner

*Primary Examiner* — Philip Wang
(74) *Attorney, Agent, or Firm* — Fish & Richardson P.C.

(57) ABSTRACT

A software plugin integrated with the development environment maintains a list of independently managed assets that are installed within the development environment. The independently managed assets are provided by an entity with which the software plugin can communicate to determine whether newer versions of the assets have been released. The software plugin automatically downloads and installs the newer version of the assets with minimal, if any, user intervention. Further, the software plugin monitors the interdependencies between different assets installed within the development environment. When updating to a newer version of an asset, the software plugin identifies any conflicts that may occur with regards to the interdependencies when the asset is updated.

20 Claims, 5 Drawing Sheets

MANAGING SOFTWARE ASSETS INSTALLED IN AN INTEGRATED DEVELOPMENT ENVIRONMENT

CROSS-REFERENCE TO RELATED APPLICATION

This application is a continuation of U.S. application Ser. No. 15/065,116, filed Mar. 9, 2016, the contents of which are hereby incorporated by reference.

BACKGROUND

This specification relates to software development platforms, and particularly to managing software assets installed in an integrated development environment (IDE).

Integrated development environments (IDEs) provide software developers with a variety of tools related to software development. These tools include editing, compiling, linking, executing, testing, debugging, and profiling source code. Some IDEs also allow software developers to download and install third party software assets, such as libraries and/or software development kits (SDKs), needed to develop their programs. These third party software assets are accessible to the software developers for integrating with programs that are developed by the developers within the IDE. Oftentimes, maintaining and updating these software assets installed within an IDE presents a challenge for software developers.

SUMMARY

Figure 1:
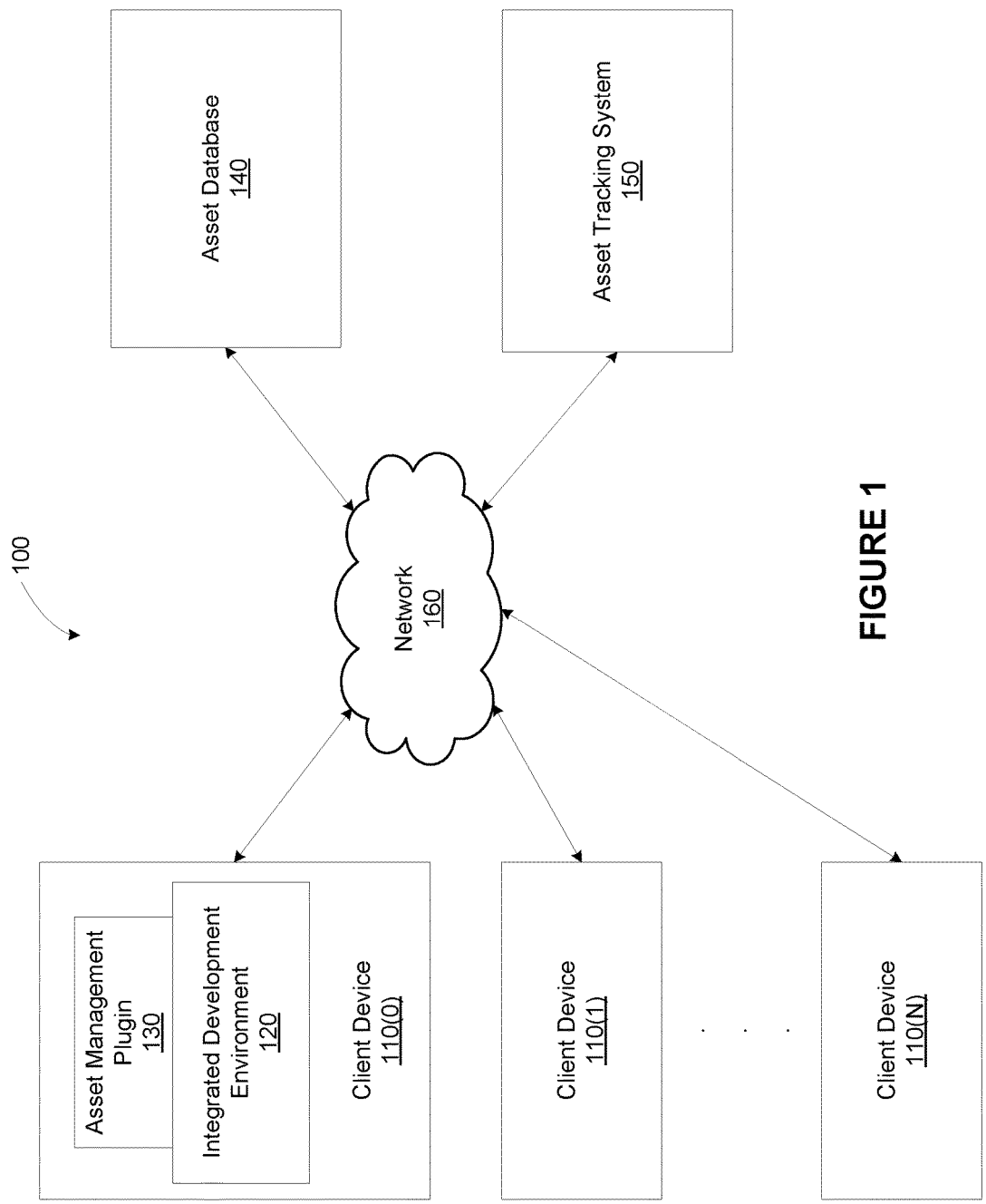
FIG. 1 illustrates a system environment for managing software assets, according to one embodiment.

Disclosed herein are methods for installing and managing software assets within a development environment independent of management functionality provided by the development environment. In operation, a software plugin integrated with the development environment maintains a list of independently managed assets that are installed within the development environment. The independently managed assets are provided by an entity with which the software plugin can communicate to determine whether newer versions of the assets have been released. The software plugin automatically downloads and installs the newer version of the assets with minimal, if any, user intervention. Further, the software plugin monitors the interdependencies between different assets installed within the development environment. When updating to a newer version of an asset, the software plugin identifies any conflicts that may occur with regards to the interdependencies when the asset is updated.

DETAILED DESCRIPTION

I. Overview

This document describes the functionality of an asset management plugin that integrates with a software development platform, such as an integrated development interface (IDE), to manage software assets installed within the IDE. The software assets are created by an entity that co-ordinates the management of the assets with the asset management plugin. The management of the assets comprises downloading and installing the assets and automatically determining the availability of updates to the installed assets.

The asset management plugin includes a dynamically configurable user interface flow for displaying onboarding instructions for installing software assets. When a given software asset is downloaded, the asset management plugin injects an onboarding flow specified in the software asset into the onboarding user interface. The onboarding flow is asset-specific and enables a user of the onboarding user interface to install, configure, and view asset-specific information associated with the downloaded asset. The asset management plugin also determines any conflicts that would arise if the downloaded asset were installed and presents these to the user in the onboarding user interface.

The functionality of the asset management plugin allows for automatically managing software assets independent of functionality provided by the software development platform, which often requires the user to manually perform such management tasks. Specifically, the asset management plugin maintains a list of the installed versions of the assets and enables software developers to download and install, from within the IDE, any new versions of the assets as such versions become available. Further, the configurable onboarding interface provided by the asset management plugin allows the entity that created the software asset to control aspects of the onboarding flow specific to the downloaded software asset. By operating this asset-specific onboarding flow, a software developer can configure aspects of the software asset using an intuitive flow created specifically for that asset.

The asset management plugin also monitors incompatibilities resulting from interdependencies across different installed assets. Specifically, when installing an asset dependent on additional software assets, previously-installed assets within the IDE may depend on an earlier and incompatible version of the additional software assets. This results in an incompatibility between the asset to be installed and the previously-installed assets due to their common interdependencies. The asset management plugin monitors such interdependencies and incompatibilities and provides alerts to a user of the IDE prior to installing an asset that would cause such an incompatibility.

II. System Environment

FIG. 1 illustrates a system environment 100 for managing software assets, according to one embodiment. The system environment 100 includes client devices 110(0)-(N), an asset database 140 and an asset tracking system 150.

Each of the client devices 110(0)-(N) (collectively, client devices 110 and, individually, client device 110) includes one or more computing devices capable of receiving user input as well as transmitting and/or receiving data via the network 160. In one embodiment, a client device 110 is a conventional computer system, such as a desktop or laptop computer. Alternatively, a client device 110 may be a device having computer functionality, such as a personal digital assistant (PDA), a mobile telephone, a smartphone or another suitable device. A client device 110 is configured to communicate via the network 160. In one embodiment, a client device 110 executes an application allowing a user of the client device 110 to interact with the application runtime 110. For example, a client device 110 executes a browser application to enable interaction between the client device 110 and the application runtime 110 via the network 160. In another embodiment, a client device 110 interacts with the application runtime 110 through an application programming interface (API) running on a native operating system of the client device 110, such as IOS® or ANDROID™.

The client device 110 executes an integrated development environment (IDE) 120 and an asset management plugin 130 coupled to the IDE 120. The IDE 120 is a software program that provides a software developer with a wide variety of tools that aid in the process of software development. These tools provide functionality for one or more of editing, compiling, linking, executing, testing, debugging, and profiling source code.

The IDE 120 also allows for installing software assets, such as third party libraries, that are needed to properly compile and execute the source code. A software asset is typically a reusable software component that provides certain functionality that may be integrated into the source code without having to independently develop the functionality. In one embodiment, the IDE 120 enables software developers to install software assets that are downloaded from the asset database 140. The asset database 140 stores the binary or the executable files associated with different software assets and serves those files to the IDE 120 upon request. The files are often published to the asset database 140 by third party entities for distribution to users of the IDE 120. In alternative embodiments, the IDE 120 enables software developers to install software assets by uploading independent binary or executable files or via another mechanism that does not require the asset database 140.

The IDE 120 may provide functionality to independently manage the software assets installed within the IDE 120. Such functionality includes downloading, deleting, and updating the software assets. Alternatively, the software assets installed in the IDE 120 may be managed by other entities that integrate with the IDE 120, such as the asset management plugin 130. The asset management plugin 130 is a software component that integrates with the IDE 120 to manage at least a subset of software assets that are installed in the IDE 120. In various embodiments, the asset management plugin 130 maintains a list of software assets installed in the IDE 120, determines when certain assets need to be updated, and enables a user of the IDE 120 to update those assets without impacting the functionality of the IDE 120, the updated assets, or other assets installed in the IDE 120.

The asset tracking system 150 publishes software assets to the asset database 140 that may be installed in the IDE 120. For these published software assets, the asset tracking system 150 maintains information related to the version histories and the dependencies of the software assets. The asset management plugin 130 uses the information maintained by the asset tracking system 150 to enable a user of the IDE 120 to update software assets that were published by the asset tracking system 150 to the asset database 140 and then installed in the IDE 120. In one embodiment, the asset tracking system 150 and the asset management plugin 130 belong to the same entity, while the IDE 120 belongs to a separate and independent entity. The operational details of the asset management plugin 130 and the asset tracking system 150 are described in conjunction with FIGS. 2-4 below.

The various components of the system 100, i.e., the client device 110, the asset database 140 and the asset tracking system 150, are configured to communicate via the network 160. The network 160 may comprise any combination of local area and/or wide area networks, using both wired and/or wireless communication systems. In one embodiment, the network 160 uses standard communications technologies and/or protocols. For example, the network 160 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 160 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 160 may be represented using any suitable format, such as hypertext markup language (HTML) or extensible markup language (XML). In some embodiments, all or some of the communication links of the network 160 may be encrypted using any suitable technique or techniques.

Figure 2:
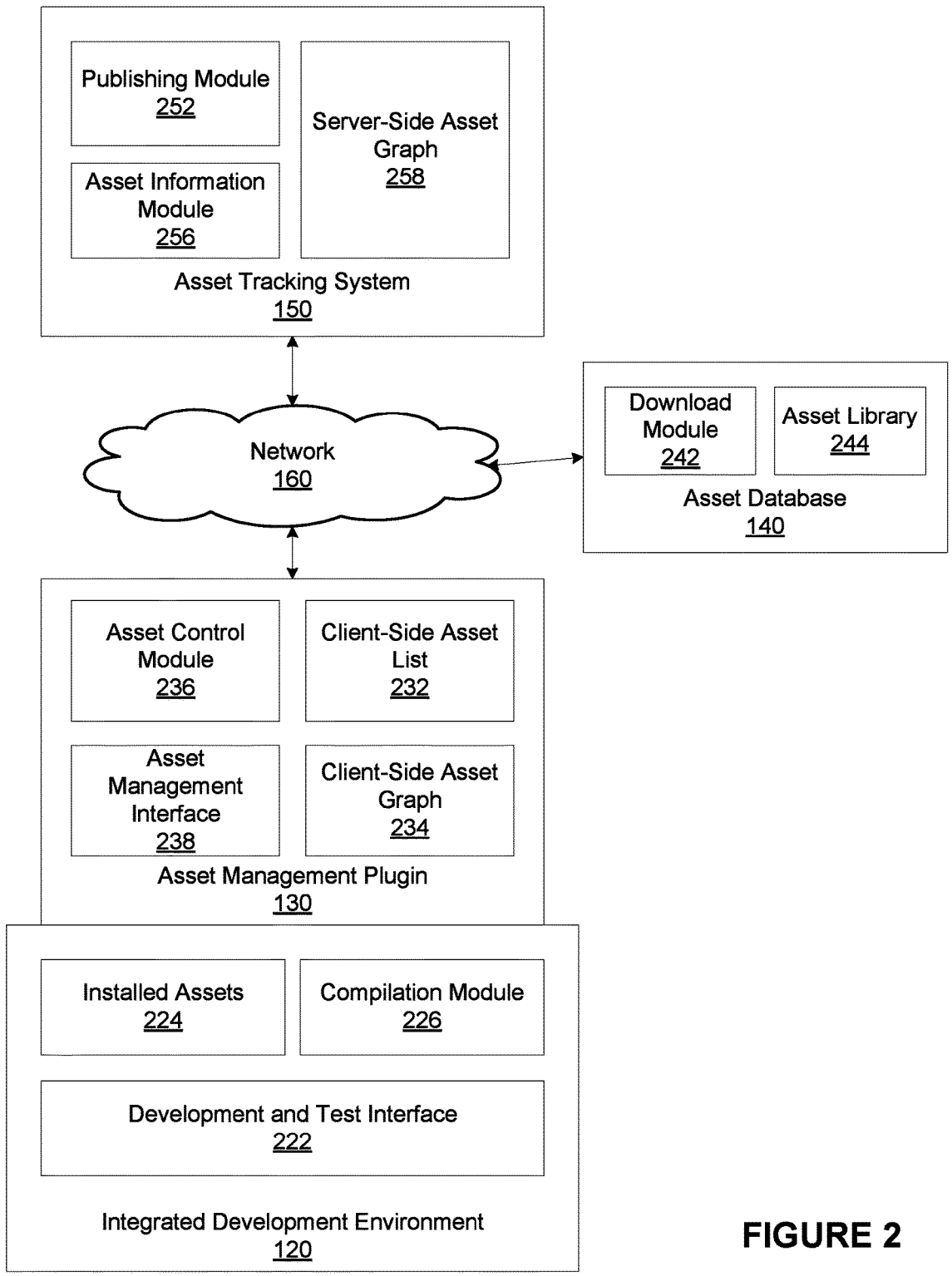
FIG. 2 illustrates a detailed block diagram of the various components of the system in FIG. 1, according to one embodiment.

FIG. 2 illustrates a detailed block diagram of the various components of the system 100 in FIG. 1, according to one embodiment.

The asset database 140 includes a download module 242 and an asset library 244. The asset library 244 stores binary and/or executable files associated with software assets published by different entities, including the asset tracking system 150. In one embodiment, the software assets stored in the asset library 244 are formatted or created in a manner that satisfy guidelines set forth by the asset database 140 for the different entities. Each software asset in the asset library 244 may be downloaded for installation. In particular, the download module 242 receives requests for downloading one or more software assets and, in response to those requests, transmits the file(s) associated with the software assets. In one embodiment, a request for downloading a software asset includes an identifier associated with the software asset, any credentialing information needed to access and download the software asset, one or more properties of the device/IDE on which the asset is to be installed, and/or payment information for paying for the software asset.

The asset tracking system 150 includes a publishing module 252, a version information module 256, and a server-side version graph 258. The publishing module 252 publishes software assets created by the asset tracking system 150 or entities associated with the asset tracking system 150 to the asset database 140. Software assets published by the publishing module 252 to the asset database 140 are referred to herein as the "independently managed software assets." As discussed earlier, the asset database 140 may include other software assets published by other entities that are not a part of the independently managed software assets.

The independently managed software assets created by the asset tracking system 150 or entities associated with the asset tracking system 150 provide a variety of different functionality types. Further, these software assets may be inter-dependent, i.e., two independently managed software assets may depend on another one of the independently managed software assets. An important feature of each of the independently managed software assets is an inclusion of an asset-specific onboarding flow. In particular, an independently managed software asset includes source code that causes the display information specifically associated with the asset and/or enables the configuration of attributes specifically associated with the asset. This source code for the onboarding flow may be formatted in a pre-determined manner such that an entity compiling the source code can hook into the onboarding flow and inject the flow into a dynamically configurable interface. Section III provides additional related to the onboarding flow being injected into a dynamically configurable interface.

The asset information module 256 maintains information associated with the independently managed software assets published to the asset database 140. Specifically, for each independently managed software asset, the asset information module 256 maintains a version history of the software asset that indicates the different versions of the asset created over time. Further, the asset information module 256 maintains transitive dependency chain for the software asset that identifies other assets on which the software asset depends. These other assets may be part of the independently managed software assets or may be assets otherwise available in the asset database 140.

The asset information module 256 may also maintain information regarding any incompatibilities introduced across two subsequent versions of a software asset. For example, if version 1.0 and version 1.1 of software asset A are incompatible, the version history would indicate that the transition from 1.0 to 1.1 introduced an incompatibility among the two versions. Incompatibility across versions of a given software asset impacts other software assets that depend on the given software asset. Specifically, a software asset that depends on an earlier version of another software asset may not be able to operate as intended with a later version of the software asset that is incompatible with the earlier version.

In one embodiment, the asset information module 256 stores information associated with the independently managed software assets in a server-side asset graph 258 (also referred to herein as "graph 258"). The server-side asset graph 258 is a data structure that stores, for each independently managed software asset, the version history, the transitive dependency chain, any incompatibilities across versions, and other relevant metadata. The asset information module 256 updates the server-side asset graph 258 each time any of the independently managed software assets is modified. For example, when publishing module 252 publishes a new version 1.2 of software asset A to the asset database 140, the asset information module 256 updates the server-side asset graph to include information about the new version 1.2.

Each time the server-side asset graph 258 is updated by the asset information module 256, an identifier associated with the graph 258 is also updated. The identifier may be a version number of the graph 258 generated by the asset information module 256 that is incremented each time the graph 258 is updated. Alternatively, the identifier may be a hash of the content or a portion of the content of the graph 258, which would change every time the graph 258 is updated with different content. In one embodiment, the asset information module 256 stores the identifier within the server-side asset graph 258.

The server-side asset graph 258 is structured according to a pre-defined format that allows for programmatically querying different portions of the graph 258. Below is an example structure of the graph 258:

```
{
  "version":"<version>",
  "dependencies":[
    {
      "name":"dependency1",
      "version":"version1",
      "packageURL":"URL1",
      "packageName":"Packagename1",
      "manifest":"ManifestLocation1",
      "releaseNotesURL":"ReleaseNotesURL1"
      "dependsOn":["transitiveDependency1", . . . , "transitiveDependencyN"],
      "minimumPluginVersion":"PluginVersion1"
    },
    {
      "name":"transitiveDependency1",
      "packageURL":"URL2",
      "packageName":"PackageName2",
      "manifest":"ManifestLocation2",
      "releaseNotesURL":"ReleaseNotesURL2",
      "dependsOn":[ ],
      "minimumPluginVersion":"PluginVersion1"
    }, . .
  ],
  }
  "name":"transitiveDependency1",
  "versions":"version1", . . . , "versionN",
  }, . .
  ]
}
```

The structure includes a "version" field, and value of the "version" field stores the identifier associated with the graph 258. The value of the "version" field is updated by the asset information module 256 when the graph 258 is updated. The structure also includes a "dependencies" field. The value of the "dependencies" field stores information about each of the independently managed software assets in separate nested structures. In the example below, for each independently managed software asset, the graph 258 stores a "name" field, a "version" field, a "packageURL" field, a "packageName" field, a "manifest" field, a "releaseNotesURL" field, a "dependsOn" field, and a "minimumPluginVersion" field. The value of the "name" field stores the name of the software asset, the value of the "version" field stores the most recently version of the software asset, the value of "packageURL" field stores the uniform resource locator (URL) from where the asset may be downloaded, and the value of "packageName" field stores name of the asset. The value of the "manifest" field stores the location of a manifest file associated with the asset. The manifest file lists all the files that are used by the asset when installed, and, thus, when the asset is being deleted, any file not listed in the manifest file may be deleted. The value of the "releaseNotesURL" field stores the location of the release notes associated with the asset and the value of the "dependsOn" field stores the transitive dependency chain for the software asset, i.e., a list of other software assets on which the software asset depends. The value of the "minimumPluginVersion" field stores the minimum version of the asset management plugin 130 that is needed to download and install the asset.

The structure also includes an "incompatibility" field. The value of the "incompatibility" field stores incompatibility information, if any, for each of the software assets on which other assets depend (as identified by the various "dependsOn" fields). The incompatibility information for a software asset is captured by the "name" field and the "versions"

field. The value of the "name" field stores the name of the software asset, and the value of the "versions" field identifies one or more versions of the software that are incompatible with other versions of the software.

As discussed below, the asset information module 256 uses the server-side asset graph 258 to process requests received from the asset management plugin 130 regarding version information associated with the graph 258 and/or the independently managed software assets that may be installed within the IDE 120.

The IDE 120 includes a development and test interface 222, installed assets 224, and a compilation module 226. The development and test interface 222 that enables a software developer to write code and perform one or more functions related to compiling, testing, debugging the code. The development and test interface 222 may be a graphical user interface, a text-based user interface.

The compilation module 226 compiles, i.e., transforms, source code written in a programming language into machine code. The compilation module 226 transforms the code written by a user of the IDE 120 into machine code that may be executed and tested. In one embodiment, the compilation module 226 operates as a just-in-time (JIT) compiler. In such an embodiment, the compilation module 226 first transforms source code into byte code that can be compiled at runtime into machine readable instructions. This allows for runtime modifications and optimizations to the functionality provided by the source code.

The installed assets 224 are the assets downloaded from the asset database 140 and installed within the IDE 120. One or more of the installed assets 224 may be the independently managed software assets that are published to the asset database 140 by the asset tracking system 150 (as described above). The independently managed software assets that are a part of the installed assets 224 are managed by the asset management plugin 130 independent of any management functionality provided by the IDE 120 for managing software assets.

The asset management plugin 130 includes a client-side asset list 232, a client-side asset graph 234, an asset control module 236, and an asset management interface 238. The asset control module 236 controls the download, installation, and maintenance of the independently managed assets that are a part of the installed assets 224. The asset control module 236 maintains the client-side asset list 232 that identifies which, if any, of the independently managed software assets are part of the installed assets 224.

The asset control module 236 also maintains the client-side asset graph 234. The client side-asset graph 234 is a local version of the server-side asset graph 258 that stores information associated with the independently managed assets installed in the IDE 120. The type of information stored in the client-side asset graph 234 mirrors the type of information stored in the server-side asset graph. The versions of the two graphs, however, may be different at a given point in time depending on the most recent updates to the independently managed software assets that are available for installation but are not currently installed within the IDE 120.

The asset management interface 238 is a graphical user interface that operates in conjunction with the asset control module 236 to enables a user of the IDE 120 to view information about the independently managed assets that are a part of the installed assets 224 and trigger certain maintenance operations on those assets that are not automatically performed by the asset control module 236.

III. Installing and Managing the Independently Managed Software Assets within the IDE As discussed above, the independently managed software assets that are a part of the installed assets 224 are managed by the asset management plugin 130 independent of management functionality provided by the IDE 120 for managing software assets. In particular, the asset control module 236 downloads and installs the independently managed software assets within the IDE 120. The details of downloading and installing an independently managed software asset "A" are discussed below in Section IIIa. The asset control module 236 also monitors the asset tracking system 150 to determine whether newer versions of the installed assets are available for download and facilitates the download of the newer version. The details of updating to a newer version of an installed independently managed software asset "A" are discussed below in Section IIIb. Further, the asset control module 236 also identifies incompatibilities across different independently managed software assets installed or to be installed within the IDE 120. The details of identifying such incompatibilities are discussed below in Section IIIc. The asset control module 236 also monitors the asset tracking system 150 to determine whether newer versions of the asset management plugin 130 are available and then automatically and seamlessly updates itself to the newer version. The details of updating the asset management plugin 130 are discussed below in Section IIId.

IIIa. Download and Install an Independently Managed Software Asset

Upon invocation, the asset management interface 238 presents to a user of the IDE 120 a list of independently managed software assets published by the asset tracking system 150 to the asset database 140 that are not currently installed in the IDE 120. In operation, when the asset management interface 238 is invoked, the asset control module 236 may request the list of independently managed software assets from the asset information module 256. The asset control module 236 then compares the list received from the asset information module 256 with the client-side asset list 232 to determine whether any of the assets in the received list are not currently installed in the IDE 120. For the sake of discussion, the following assumes that independently managed software asset "A" (also referred to as "asset A") is not currently installed in the IDE 120.

The asset management interface 238 displays to the user that asset A is available for download. The asset management interface 238 may also display additional information associated with asset A, such as readme text, any dependencies, version history, etc. When the user requests that asset A be downloaded, the asset control module 236 triggers a download mechanism provided by the IDE 120 to download the files associated with asset A from the asset database 140.

During compilation of the downloaded asset A, the asset control module 236 analyzes the code of asset A includes in the files to initialize an onboarding flow associated with asset A. As discussed above, an important aspect of independently managed software assets, such as asset A, is an inclusion of an asset-specific onboarding flow. In particular, asset A includes a controller mechanism that encapsulates the onboarding flow specific to asset A. The controller mechanism provides a hook for the asset control module 236 to initialize the asset-specific onboarding flow of asset A and injecting the flow into the asset management interface 238. Once injected into the asset management interface 238, the asset-specific onboarding flow enables the user to view information specifically associated with asset A, configure attributes specifically associated with asset A, and install the asset A within the IDE 120. When asset A is installed, the asset control module 236 updates the client-side asset list 232 to indicate that asset A has been installed within the IDE 120. The asset control module 236 also updates the client-side asset list 232 to indicate a version identifier associated with the version of asset A that was installed.

In one embodiment, the asset control module 236 identifies the controller mechanism using reflection. Specifically, the asset control module 236 generates a function name for instantiating the controller mechanism based on the name of the asset A. The generated function name should match the actual function name of the controller mechanism because the controller mechanism is formatted according to a predetermined format and the asset control module 236 has knowledge of this format. The asset control module 236 can then initialize the asset-specific onboarding flow by calling the generated function name on the code of the asset A.

In some embodiments, an asset downloaded from the asset database 140 does not include an asset-specific onboarding flow. In such scenarios, the downloaded asset, when installed, is considered to be configured and thus does not have any additional configuration steps. In one embodiment, the asset control module 236 identifies such an asset by determining that the asset does not include a controller mechanism for hooking into the onboarding flow.

IIIb. Update an Independently Managed Software Asset to a New Version

The asset control module 236 monitors the various independently managed software assets that are installed within the IDE 120 to automatically determine whether any updates are available to those assets. Specifically, the asset control module 236, periodically or upon invocation of the asset management interface 238, requests the asset information module 256 for the most recent version identifiers that are available for the independently managed software assets installed within the IDE 120. The asset control module 236 compares, for each asset installed within the IDE 120, the installed version identifier with the most recent version identifier. If the installed version identifier differs from the most recent version identifier, then the asset control module 236 enables the user of the IDE 120 to download and install the most recent version of the asset via the asset management interface 238.

Figure 3:
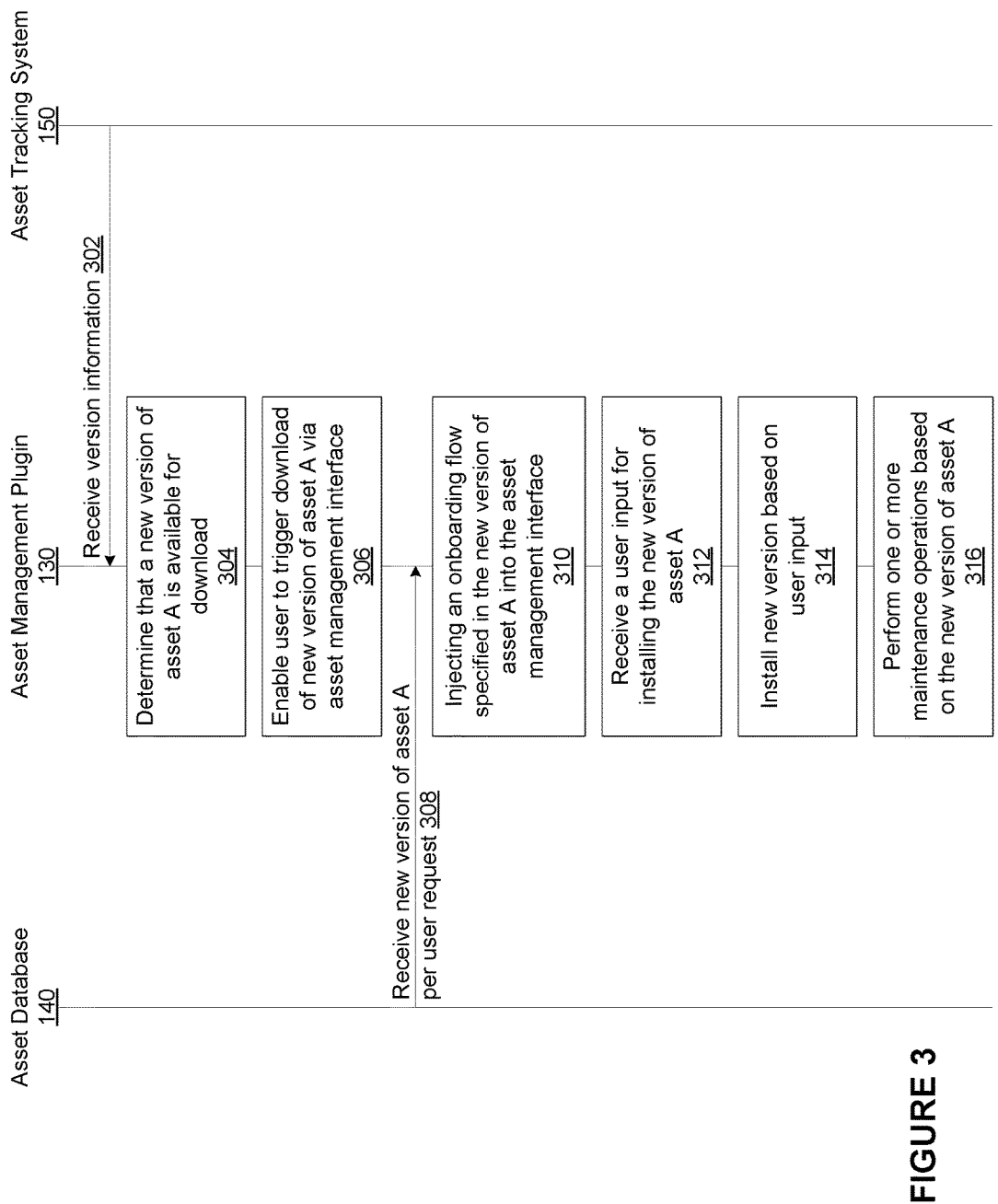
FIG. 3 is an event diagram illustrating steps for updating an independently managed software asset installed within the IDE, according to one embodiment.

FIG. 3 is an event diagram illustrating steps for updating an independently managed software asset installed within the IDE 120, according to one embodiment. For the ease of explanation, the discussion with respect to FIG. 3 contemplates updating asset A, a particular independently managed software asset installed within the IDE 120. A similar process may be executed for each of the independently managed software assets that are installed within the IDE 120.

The asset control module 236 of the asset management plugin 130 receives 302 from the asset tracking system 150 version information of asset A. In operation, the asset control module 236 may periodically request version information from the asset tracking system 150 or may request the version information when a user invokes the asset management interface 238. The version information associated with asset A identifies the most recent version of the asset that is available for download.

The asset control module 236 determines 304, based on the version information of asset A, that a new version of asset A is available for download and installation within the IDE 120. Specifically, the asset control module 236 compares the version identifier stored in the client-side asset list 232 for asset A with the version information received from the asset tracking system 150. When the version identifier and the version information do not match, the asset control module 236 determines that asset A has been updated and a new version (relative to the installed version) is available for download and installation within the IDE 120.

Because a new version is available, the asset control module 236 enables a user of the IDE 120 to trigger the download of the new version of asset A from the asset database 140. Specifically, the asset control module 236 causes the asset management interface 238 to display to the user that a new version of asset A is available for download. The asset management interface 238 may also display additional information associated with asset A, such as readme text, any dependencies, version history, etc. When the user requests that asset A be downloaded, the asset control module 236 triggers a download mechanism provided by the IDE 120 to download the files associated with the new version of asset A from the asset database 140.

The asset control module 236 receives 308 the files associated with the updated asset A from the asset database 140. As discussed above, the asset tracking system 150 publishes the independently managed software assets created by the asset tracking system 150 or entities associated with the asset tracking system 150 to the asset database 140. The asset database 140 may include other software assets published by other entities that are not a part of the independently managed software assets. In some embodiments, these other software assets are not available for download or updating via the functionality of the asset management plugin 130 described herein.

The asset control module 236 injects 310 an asset-specific onboarding flow specified in the new version of asset A into the asset management interface 238 for display to the user. As discussed above, asset A includes a controller mechanism that encapsulates the onboarding flow specific to asset A, and the asset control module 236 injects the flow into the asset management interface 238 using the controller mechanism.

The asset control module 236, via the asset management interface 238, receives 312 a user input for installing the new version of asset A within the IDE 120. In response, the asset control module 236 installs 314 the new version. In one embodiment, the asset control module 236 integrates with installation features provided by the IDE 120 to install the new version of asset A into the IDE 120. The asset control module 236 also performs 316 one or more maintenance operations based on the newly installed version of asset A. Such maintenance operations include modifying, e.g., adding, removing, and/or overwriting, files associated with the asset A that need to be modified to be consistent with the newly installed version of asset A.

IIIc. Identifying Conflicts when Updating Software Assets

As discussed above, two subsequent versions of a software asset may be incompatible. Incompatibility across versions of a given software asset impacts other software assets that depend on the given software asset. In one embodiment, when updating a software asset, the asset control module 236 also updates any other additional software assets on which the asset being update depends. In some cases, other assets already installed within the IDE 120 continue to depend on an earlier and incompatible version of the additional software assets. Thus, updating those additional software assets would create a conflict between the asset being updated and the other assets installed within the IDE 120 that are not also being updated. The asset control module 236 identifies these conflicts and alerts a user prior to installing an update that would create such a conflict.

To identify conflicts, the asset control module 236 compares the transitive dependency chain, e.g., asset A, with the transitive dependency chain of another asset already installed, e.g., asset B, to determine whether asset A and asset B share any common dependencies. As discussed above, the transitive dependency chain identifies other assets on which a given software asset depends. When a common dependency is determined, the asset control module 236 determines whether a version of the dependency on which asset A (the asset to be installed) depends is incompatible with a currently installed version of the dependency on which asset B depends. When such an incompatibility exists, the update to asset A conflicts with the currently installed version of asset B. In response to identifying a conflict, the asset control module 236 alerts the user, prior to installing asset A, that the incompatibility exists. In some embodiments, the asset control module 236 also presents to the user an option to update the conflicting assets, i.e., asset B, in a manner that would resolve the conflict.

In one embodiment, the asset control module 236 operates in conjunction with the asset information module 256 in the asset tracking system 150 to identify conflicts between an asset to be installed (asset A) and a currently installed asset (asset B). Specifically, the asset control module 236 requests the transitive dependency chain from the asset information module 256 for asset A. In response, the asset information module 256 extracts the transitive dependency chain associated with asset A from the server-side asset graph 258 and transmits the extracted transitive dependency chain to the asset control module 236. The asset control module 236 then extracts the transitive dependency chain of asset B from the client-side asset graph 234. This transitive dependency chain identifies the assets on which the currently installed version of asset B depends. The asset control module 236 then compares the transitive dependency chains as discussed above to identify any common dependencies that are incompatible and thus lead to a conflict.

Figure 4:
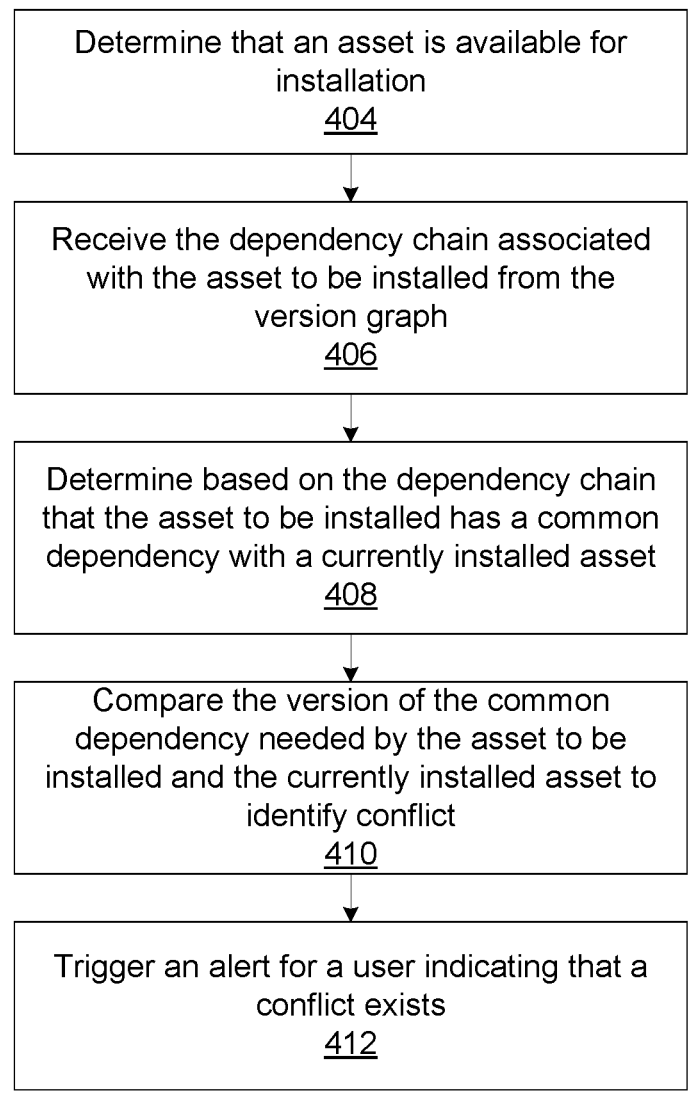
FIG. 4 is a flowchart illustrating steps for identifying a conflict between a version of a software asset to be installed and another software asset to be installed within the IDE 120, according to one embodiment.

FIG. 4 is a flowchart illustrating steps for identifying a conflict between a version of a software asset to be installed and another software asset to be installed within the IDE 120, according to one embodiment.

The asset control module 236 determines 404 that an independently managed software asset is available for installation within the IDE 120. This software asset may be a new asset available for installation or may be a new version of an asset already installed within the IDE 120. The asset control module 236, responsive to a request to the asset information module 256, receives 406 the transitive dependency chain of the asset determined in 404.

Based on the transitive dependency chain, the asset control module 236 determines 408 that the asset to be installed shares a common dependency with another asset previously installed within the IDE 120. The asset control module 236 then compares 410 the version of the common dependency needed by the asset to be installed and the version needed by the previously installed asset to identify a conflict. In response to identifying a conflict, the asset control module 236 triggers 410 an alert for the user indicating that a conflict exists between the two software assets.

IIId. Update of the Asset Management Plugin to a New Version

In one embodiment, the asset management plugin 130 detects and installs new versions of itself within the IDE 120. Specifically, the asset management plugin 130 periodically polls the asset tracking system 150 to determine whether a new version of the plugin 130 as a whole is available. When a new version is available, the plugin 130 indicates to the user of the IDE 120 that a new version is available and provides the user with an option, via the asset management interface 238, to trigger a download and install of the new version. Once the download is complete, the plugin 130 uses the just-in-time (JIT) compilation of the IDE 120 to overwrite the source files for itself and re-launch the plugin 130 with the latest version. The installation and subsequent re-launch removes any manual user interaction once the download is triggered by the user.

IV. Example Machine Architecture

Figure 5:
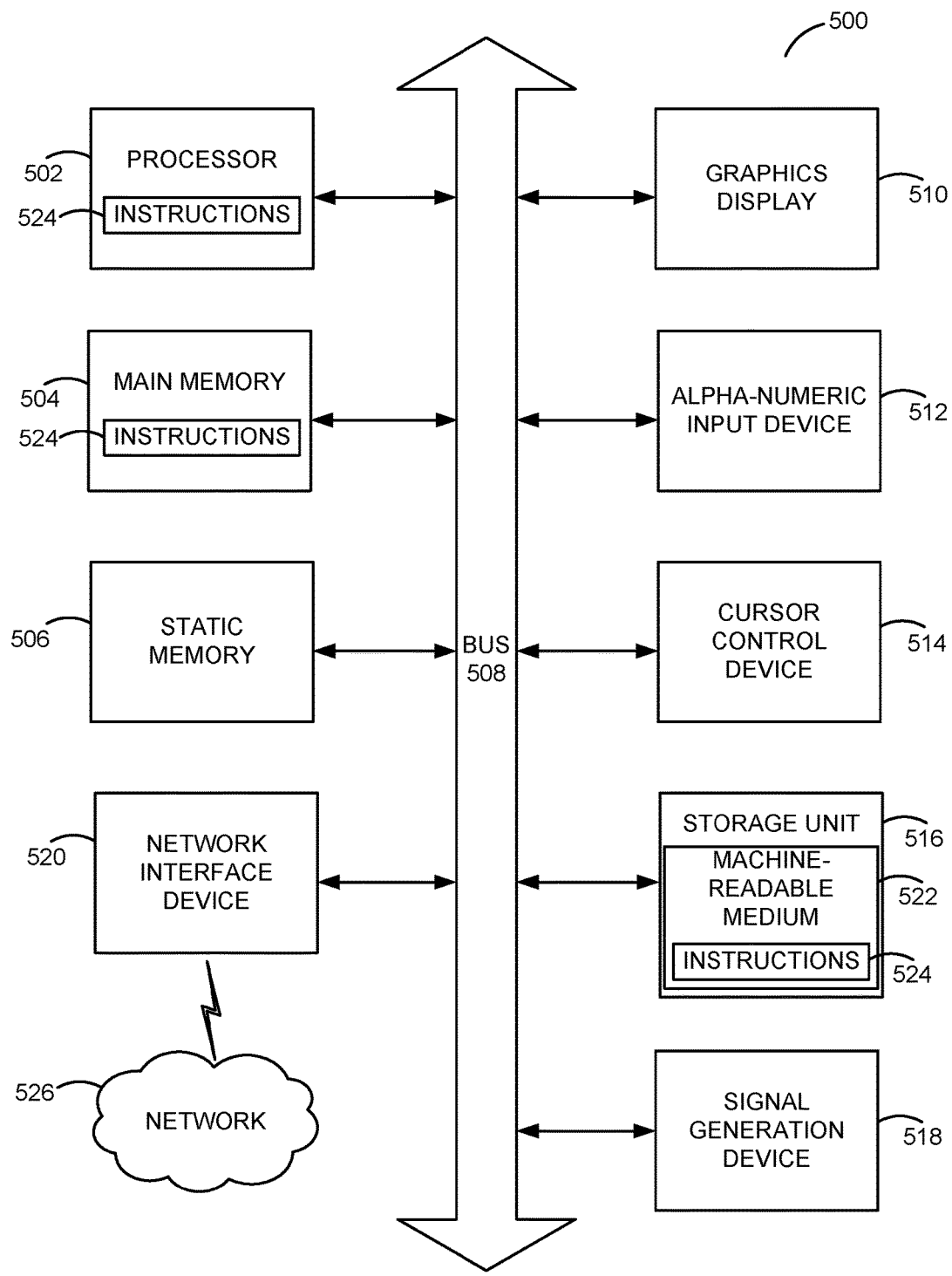
FIG. 5 is a block diagram illustrating components of an example machine able to read instructions from a machine-readable medium and execute them in a processor (or controller), according to one embodiment.

FIG. 5 is a block diagram illustrating components of an example machine able to read instructions from a machine-readable medium and execute them in a processor (or controller), according to one embodiment. Specifically, FIG. 5 shows a diagrammatic representation of a machine in the example form of a computer system 500. The computer system 500 can be used to execute instructions 524 (e.g., program code or software) for causing the machine to perform any one or more of the methodologies (or processes) described herein. In alternative embodiments, the machine operates as a standalone device or a connected (e.g., networked) device that connects to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a smartphone, an internet of things (IoT) appliance, a network router, switch or bridge, or any machine capable of executing instructions 524 (sequential or otherwise) that specify actions to be taken by that machine. Further, while only a single machine is illustrated, the term "machine" shall also be taken to include any collection of machines that individually or jointly execute instructions 524 to perform any one or more of the methodologies discussed herein.

The example computer system 500 includes one or more processing units (generally processor 502). The processor 502 is, for example, a central processing unit (CPU), a graphics processing unit (GPU), a digital signal processor (DSP), a controller, a state machine, one or more application specific integrated circuits (ASICs), one or more radio-frequency integrated circuits (RFICs), or any combination of these. The computer system 500 also includes a main memory 504. The computer system may include a storage unit 516. The processor 502, memory 504 and the storage unit 516 communicate via a bus 508.

In addition, the computer system 506 can include a static memory 506, a display driver 150 (e.g., to drive a plasma display panel (PDP), a liquid crystal display (LCD), or a projector). The computer system 500 may also include alphanumeric input device 552 (e.g., a keyboard), a cursor control device 514 (e.g., a mouse, a trackball, a joystick, a motion sensor, or other pointing instrument), a signal generation device 518 (e.g., a speaker), and a network interface device 520, which also are configured to communicate via the bus 508.

The storage unit 516 includes a machine-readable medium 522 on which is stored instructions 524 (e.g., software) embodying any one or more of the methodologies or functions described herein. The instructions 524 may also reside, completely or at least partially, within the main memory 504 or within the processor 502 (e.g., within a processor's cache memory) during execution thereof by the computer system 500, the main memory 504 and the processor 502 also constituting machine-readable media. The instructions 524 may be transmitted or received over a network 526 via the network interface device 520.

While machine-readable medium 522 is shown in an example embodiment to be a single medium, the term "machine-readable medium" should be taken to include a single medium or multiple media (e.g., a centralized or distributed database, or associated caches and servers) able to store the instructions 524. The term "machine-readable medium" shall also be taken to include any medium that is capable of storing instructions 524 for execution by the machine and that cause the machine to perform any one or more of the methodologies disclosed herein. The term "machine-readable medium" includes, but not be limited to, data repositories in the form of solid-state memories, optical media, and magnetic media.

V. Additional Considerations

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms, for example, as illustrated in FIGS. 1, 2, and 5. Modules may constitute either software modules (e.g., code embodied on a machine-readable medium) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

The various operations of example methods described herein may be performed, at least partially, by one or more processors, e.g., processor 102, that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for independently managing software assets installed in an integrated development environment through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A computer-implemented method comprising:
    providing, to a device associated with a user of an integrated development environment (IDE), an asset management user interface that identifies one or more independently managed software assets that are (i) published to an asset database by an asset tracking system, (ii) not currently installed in the IDE, and (iii) available for download;
    receiving data identifying a particular software asset that was selected through the asset management user interface;
    in response to receiving the data identifying the particular software asset, providing, to the device associated with the user of the IDE and through the asset management user interface, a representation of an asset-specific onboarding flow associated with the particular software asset, the onboarding flow including a control for initiating installation of the particular software asset within the IDE;
    receiving data indicating a selection of the control for initiating installation of the particular software asset within the IDE; and
    in response to receiving the data indicating the selection of the control for initiating installation of the particular software asset within the IDE, providing, to the device associated with the user of the IDE and through the asset management user interface, an indication that the particular software asset has been installed within the IDE.

2. The method of claim 1, comprising, in response to receiving the data indicating the selection of the control for initiating installation of the particular software asset within the IDE, triggering the IDE to download files associated with the particular software asset from the asset database.

3. The method of claim 2, comprising:
    in response to receiving the data indicating the selection of the control for initiating installation of the particular software asset within the IDE, analyzing the downloaded files associated with the particular software asset from the asset database; and
    based on analyzing the downloaded files associated with the particular software asset from the asset database, initializing the asset-specific onboarding flow associated with the particular software asset.

4. The method of claim 3, comprising, in response to initializing the asset-specific onboarding flow associated with the particular software asset, providing, to the device associated with the user of the IDE and through the asset management user interface, control for one or more of viewing information associated with the particular software asset and configuring attributes associated with the particular software asset.

5. The method of claim 1, comprising updating the asset management user interface that identifies one or more independently managed software assets to indicate that (i) the particular software asset has been installed within the IDE and (ii) a version identifier associated with a version of the particular software asset has been installed within the IDE.

6. The method of claim 1, comprising:
    generating, by the asset management user interface, a function name for instantiating the installation of the of the particular software asset within the IDE, the function name corresponding to a name of the particular software asset; and
    in response to receiving the data indicating the selection of the control for initiating installation of the particular software asset within the IDE, calling the function to (i) initialize the asset-specific onboarding flow associated with the particular software asset and (ii) inject the asset-specific onboarding flow associated with the particular software asset into the asset management user interface.

7. The method of claim 1, wherein providing, to the device associated with the user of the IDE and through the asset management user interface, the representation of an asset-specific onboarding flow associated with the particular software asset comprises providing one or more representations including readme text associated with the particular software asset, a dependency of the particular software asset, a current version of the particular software asset, and version history of the particular software asset.

8. A system comprising:
    one or more computers and one or more storage devices storing instructions that are operable, when executed by the one or more computers, to cause the one or more computers to perform operations comprising:
        providing, to a device associated with a user of an integrated development environment (IDE), an asset management user interface that identifies one or more independently managed software assets that are (i) published to an asset database by an asset tracking system, (ii) not currently installed in the IDE, and (iii) available for download,
        receiving data identifying a particular software asset that was selected through the asset management user interface,
        in response to receiving the data identifying the particular software asset, providing, to the device associated with the user of the IDE and through the asset management user interface, a representation of an asset-specific onboarding flow associated with the particular software asset, the onboarding flow including a control for initiating installation of the particular software asset within the IDE, receiving data indicating a selection of the control for initiating installation of the particular software asset within the IDE, and in response to receiving the data indicating the selection of the control for initiating installation of the particular software asset within the IDE, providing, to the device associated with the user of the IDE and through the asset management user interface, an indication that the particular software asset has been installed within the IDE.

9. The system of claim 8, wherein the operations comprise, in response to receiving the data indicating the selection of the control for initiating installation of the particular software asset within the IDE, triggering the IDE to download files associated with the particular software asset from the asset database.

10. The system of claim 9, wherein the operations comprise:

in response to receiving the data indicating the selection of the control for initiating installation of the particular software asset within the IDE, analyzing the downloaded files associated with the particular software asset from the asset database; and based on analyzing the downloaded files associated with the particular software asset from the asset database, initializing the asset-specific onboarding flow associated with the particular software asset.

11. The system of claim 10, wherein the operations comprise, in response to initializing the asset-specific onboarding flow associated with the particular software asset, providing, to the device associated with the user of the IDE and through the asset management user interface, control for one or more of viewing information associated with the particular software asset and configuring attributes associated with the particular software asset.

12. The system of claim 8, wherein the operations comprise updating the asset management user interface that identifies one or more independently managed software assets to indicate that (i) the particular software asset has been installed within the IDE and (ii) a version identifier associated with a version of the particular software asset has been installed within the IDE.

13. The system of claim 8, wherein the operations comprise:

generating, by the asset management user interface, a function name for instantiating the installation of the of the particular software asset within the IDE, the function name corresponding to a name of the particular software asset; and in response to receiving the data indicating the selection of the control for initiating installation of the particular software asset within the IDE, calling the function to (i) initialize the asset-specific onboarding flow associated with the particular software asset and (ii) inject the asset-specific onboarding flow associated with the particular software asset into the asset management user interface.

14. The system of claim 8, wherein the operation of providing, to the device associated with the user of the IDE and through the asset management user interface, the representation of an asset-specific onboarding flow associated with the particular software asset comprises providing one or more representations including readme text associated with the particular software asset, a dependency of the particular software asset, a current version of the particular software asset, and version history of the particular software asset.

15. A non-transitory computer-readable medium storing software comprising instructions executable by one or more computers which, upon such execution, cause the one or more computers to perform operations comprising:

providing, to a device associated with a user of an integrated development environment (IDE), an asset management user interface that identifies one or more independently managed software assets that are (i) published to an asset database by an asset tracking system, (ii) not currently installed in the IDE, and (iii) available for download;

receiving data identifying a particular software asset that was selected through the asset management user interface;

in response to receiving the data identifying the particular software asset, providing, to the device associated with the user of the IDE and through the asset management user interface, a representation of an asset-specific onboarding flow associated with the particular software asset, the onboarding flow including a control for initiating installation of the particular software asset within the IDE;

receiving data indicating a selection of the control for initiating installation of the particular software asset within the IDE; and in response to receiving the data indicating the selection of the control for initiating installation of the particular software asset within the IDE, providing, to the device associated with the user of the IDE and through the asset management user interface, an indication that the particular software asset has been installed within the IDE.

16. The non-transitory computer-readable medium of claim 15, wherein the operations comprise, in response to receiving the data indicating the selection of the control for initiating installation of the particular software asset within the IDE, triggering the IDE to download files associated with the particular software asset from the asset database.

17. The non-transitory computer-readable medium of claim 16, wherein the operations comprise:

in response to receiving the data indicating the selection of the control for initiating installation of the particular software asset within the IDE, analyzing the downloaded files associated with the particular software asset from the asset database; and based on analyzing the downloaded files associated with the particular software asset from the asset database, initializing the asset-specific onboarding flow associated with the particular software asset.

18. The non-transitory computer-readable medium of claim 17, wherein the operations comprise, in response to initializing the asset-specific onboarding flow associated with the particular software asset, providing, to the device associated with the user of the IDE and through the asset management user interface, control for one or more of viewing information associated with the particular software asset and configuring attributes associated with the particular software asset.

19. The non-transitory computer-readable medium of claim 15, wherein the operations comprise updating the asset management user interface that identifies one or more independently managed software assets to indicate that (i)

the particular software asset has been installed within the IDE and (ii) a version identifier associated with a version of the particular software asset has been installed within the IDE.

20. The non-transitory computer-readable medium of claim 15, wherein the operations comprise:
- generating, by the asset management user interface, a function name for instantiating the installation of the of the particular software asset within the IDE, the function name corresponding to a name of the particular software asset; and
- in response to receiving the data indicating the selection of the control for initiating installation of the particular software asset within the IDE, calling the function to (i) initialize the asset-specific onboarding flow associated with the particular software asset and (ii) inject the asset-specific onboarding flow associated with the particular software asset into the asset management user interface.

* * * * *

UNITED STATES PATENT AND TRADEMARK OFFICE
CERTIFICATE OF CORRECTION

PATENT NO. : 10,365,919 B1
APPLICATION NO. : 15/597258
DATED : July 30, 2019
INVENTOR(S) : Mandrika et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 241 days.

Signed and Sealed this
Second Day of June, 2020

Andrei Iancu
*Director of the United States Patent and Trademark Office*